US008348735B2

(12) United States Patent
Izumi et al.

(10) Patent No.: US 8,348,735 B2
(45) Date of Patent: Jan. 8, 2013

(54) GAME MACHINE, GAME MACHINE CONTROL METHOD, AND INFORMATION STORAGE MEDIUM

(75) Inventors: Tadakatsu Izumi, Tokyo (JP); Shin Tsuchiya, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1497 days.

(21) Appl. No.: 11/631,926

(22) PCT Filed: Jul. 5, 2005

(86) PCT No.: PCT/JP2005/012374
§ 371 (c)(1),
(2), (4) Date: Jan. 9, 2007

(87) PCT Pub. No.: WO2006/006443
PCT Pub. Date: Jan. 19, 2006

(65) Prior Publication Data
US 2007/0232375 A1 Oct. 4, 2007

(30) Foreign Application Priority Data
Jul. 14, 2004 (JP) ................. 2004-207730

(51) Int. Cl.
A63F 9/24 (2006.01)
A63F 13/00 (2006.01)

(52) U.S. Cl. ............. 463/4; 463/1; 463/2; 463/3; 463/7; 463/36; 463/37

(58) Field of Classification Search .................. 463/1–4, 463/7, 36–37
See application file for complete search history.

(56) References Cited

U.S. PATENT DOCUMENTS

| 5,863,248 A | 1/1999 | Mine et al. |
| 6,340,332 B1 | 1/2002 | Rimoto et al. |
| 6,524,186 B2 | 2/2003 | Takatsuka et al. |

(Continued)

FOREIGN PATENT DOCUMENTS

EP 0836871 B1 7/2003

(Continued)

OTHER PUBLICATIONS

NBA Street vol. 2 Walkthrough, by Greg Boccia created on May 28, 2003, retrieved from http://faqs.ign.com/articles/400/400764p1. game released on (Apr. 28, 2003), pp. 1-5.*

(Continued)

Primary Examiner — Arthur O. Hall
Assistant Examiner — Jasson Yoo
(74) Attorney, Agent, or Firm — Sughrue Mion, PLLC

(57) ABSTRACT

Provided is a game machine allowing a game player to give an instruction to perform predetermined game processing to the game machine and an instruction of the condition of when the predetermined game processing is started. The game machine performs game processing at given time intervals, updates one or more game-related parameters, and causes the update to be reflected on a game screen. A storage unit (50) stores a parameter condition representing the condition of parameters in correspondence with each of a plurality of items of operation information indicating details of an operation for making the game machine execute given game processing. A judging unit (56) judges whether or not the one or more parameters satisfy the parameter condition corresponding to operation information indicating details of a game player's operation. A game processing executing unit (58) starts executing the given game processing in accordance with a judgment made by the judging unit (56).

11 Claims, 6 Drawing Sheets

| PRESS COUNT OF BUTTON 39R | PASS DIFFICULTY LEVEL |
|---|---|
| ONCE OR MORE AND LESS THAN 5 TIMES | 1 OR SMALLER |
| 5 TIMES OR MORE AND LESS THAN 10 TIMES | 2 OR SMALLER |
| 10 TIMES OR MORE | 3 OR SMALLER |

U.S. PATENT DOCUMENTS

| | | |
|---|---|---|
| 7,063,616 B2 | 6/2006 | Kuri |
| 2001/0044334 A1 | 11/2001 | Kuri |
| 2002/0183104 A1* | 12/2002 | Takemoto et al. ............ 463/4 |
| 2003/0032467 A1* | 2/2003 | Mayer et al. ............ 463/4 |

FOREIGN PATENT DOCUMENTS

| | | |
|---|---|---|
| EP | 1 479 419 A1 | 11/2004 |
| EP | 1479419 A1 * | 11/2004 |
| GB | 2365362 A | 2/2002 |
| JP | 11-342265 | 12/1999 |
| JP | 2000-176174 A | 6/2000 |
| JP | 2001-327751 A | 11/2001 |
| JP | 2001-327758 A | 11/2001 |
| JP | 2003-251066 A | 9/2003 |
| JP | 2003-299874 A | 10/2003 |
| JP | 2004-073895 A | 3/2004 |

OTHER PUBLICATIONS

European Office Action corresponding to European Patent Application No. 05758197.7, dated Dec. 8, 2009.

PCT International Preliminary Report on Patentability, Jan. 16, 2007.

\* cited by examiner

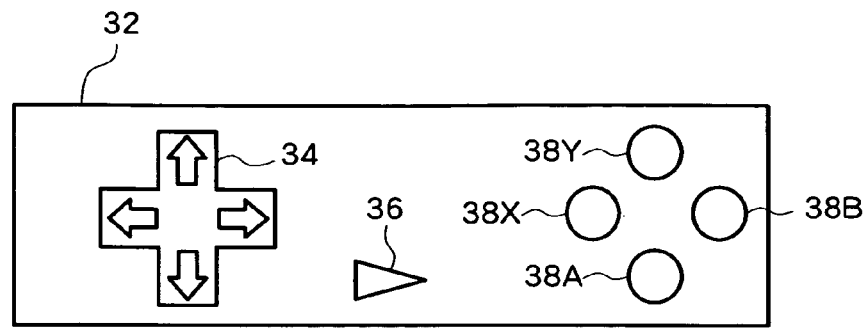
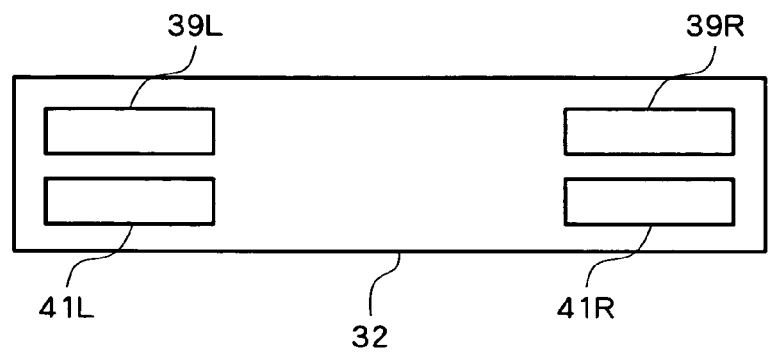
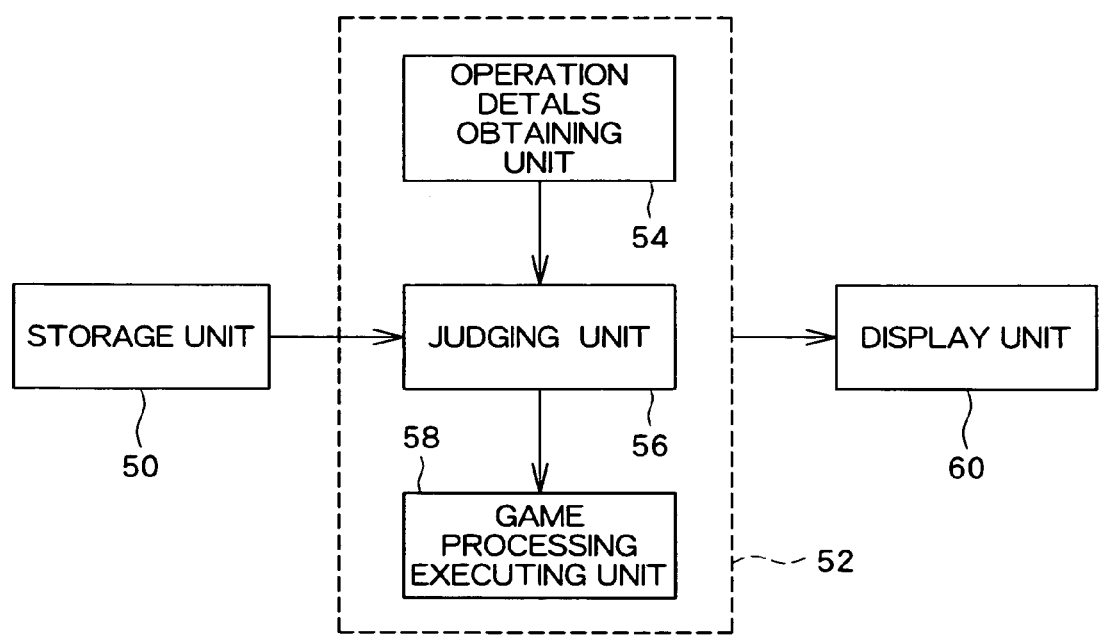

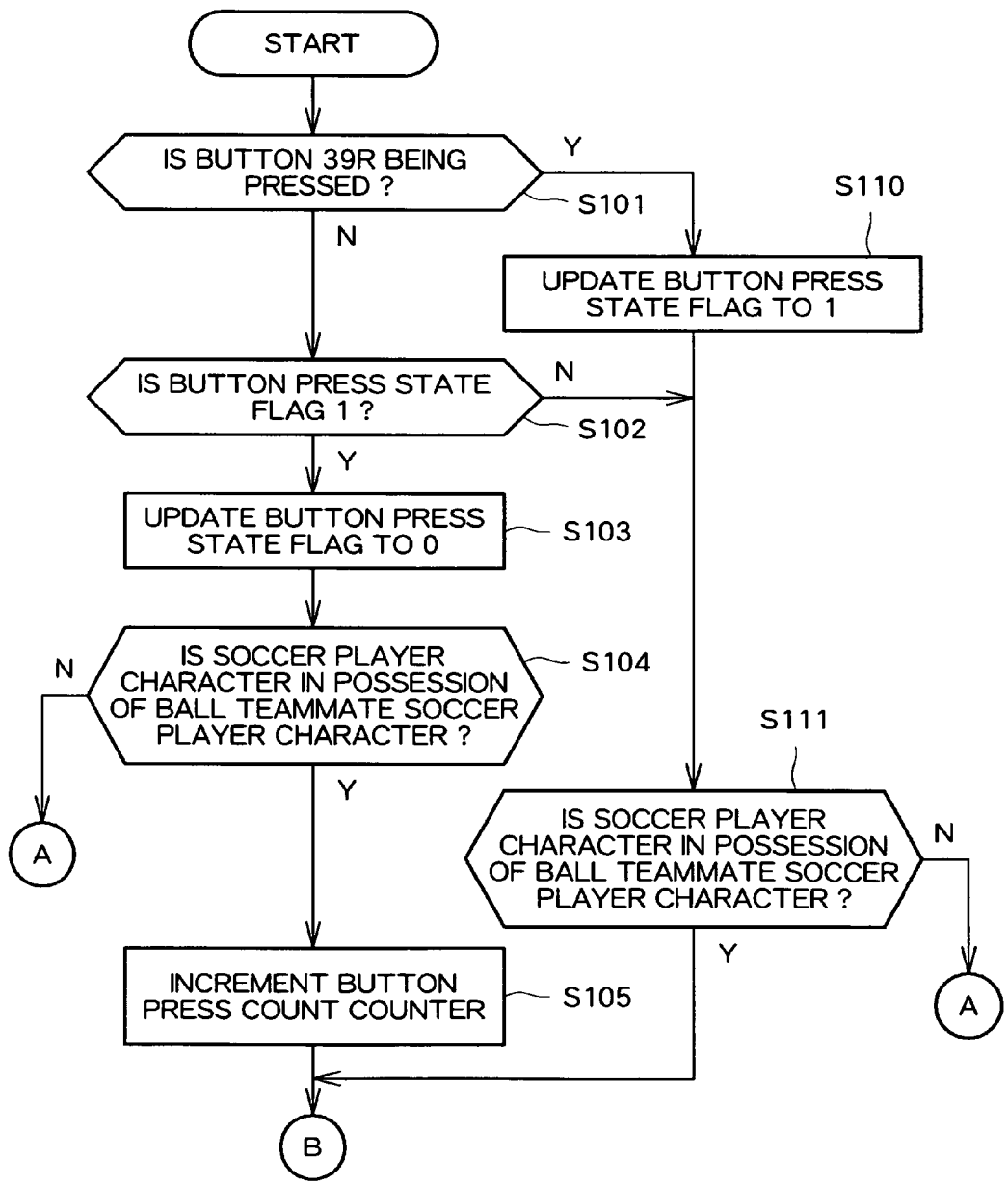

GAME MACHINE, GAME MACHINE CONTROL METHOD, AND INFORMATION STORAGE MEDIUM

TECHNICAL FIELD

The present invention relates to a game machine, a game machine control method, and an information storage medium.

BACKGROUND ART

In a common game machine, when a game player made an operation with a controller, game processing corresponding to the operation was executed. For example, in a well known type of game system, when a player operates a controller, a given game character takes an action corresponding to the operation.

DISCLOSURE OF THE INVENTION

Problem to be Solved by the Invention

However, with this type of game machine, a game player can merely give the game machine an instruction to execute predetermined game processing (for example, to make a given game character perform a given action).

The present invention has been made in view of the above-mentioned problem, and an object of the present invention is therefore to provide a game machine, a game machine control method, and an information storage medium that enable a game player not only to give the game machine an instruction to execute predetermined game processing but also to specify a condition for starting the execution of the given game processing.

Means for Solving the Problem

To solve the above-mentioned problem, according to the present invention, a game machine which executes game processing at given time intervals, updates one or more game-related parameters, and causes the update to be reflected on a game screen, includes: storage means for storing a parameter condition correspondingly to each of a plurality of items of operation information, the parameter condition indicating a condition about the one or more parameters, the operation information indicating details of an operation for making the game machine execute given game processing; operation details obtaining means for obtaining details of a game player's operation; judging means for judging whether or not the one or more parameters satisfy the parameter condition, which is stored in the storage means correspondingly to operation information indicating the operation details obtained by the operation details obtaining means; and a game processing executing means for starting execution of the given game processing in accordance with a judgment made by the judging means.

Further, according to the present invention, a method of controlling a game machine which executes game processing at given time intervals, updates one or more game-related parameters, and makes the update reflected on a game screen, includes: an operation details obtaining step of obtaining details of a game player's operation; a judging step of judging whether or not the one or more parameters satisfy a parameter condition, which is stored in storage means correspondingly to operation information indicating the operation details obtained in the operation details obtaining step, the storage means storing a parameter condition correspondingly to each of a plurality of operation information, the parameter condition indicating a condition about the one or more parameters, the operation information indicating details of an operation for making the game machine execute given game processing; and a game processing executing step of executing the given game processing in accordance with a judgment made in the judging step.

A program according to the present invention is a program for making a computer such as a household game machine, a portable game machine, a commercial game machine, a cellular phone, a personal digital assistant (PDA), or a personal computer function as a game machine that executes game processing at given time intervals, updates one or more game-related parameters, and causes the update to be reflected on a game screen, and the program also makes the computer function as: storage means for storing a parameter condition correspondingly to each of a plurality of operation information, the parameter condition indicating a condition about the one or more parameters, the operation information indicating details of an operation for making the game machine execute the given game processing; operation details obtaining means for obtaining details of a game player's operation; judging means for judging whether or not the one or more parameters satisfy the parameter condition, which is stored in the storage means correspondingly to the operation information indicating details of an operation obtained by the operation details obtaining means; and game processing executing means for starting the execution of the given game processing in accordance with a judgment made by the judging means. An information storage medium according to the present invention is an information storage medium in which the above-mentioned program is recorded.

A program distribution device according to the present invention is a program distribution device with an information storage medium recording the above-mentioned program which reads the program out of the information storage medium and distributes the program.

A program distribution method according to the present invention is a program distribution method with an information storage medium recording the above-mentioned program which reads the program out of the information storage medium and distributes the program.

The present invention relates to a game machine that executes game processing at given time intervals, updates one or more game-related parameters, and causes the update to be reflected on a game screen. In the present invention, a parameter condition, which indicates a condition about the one or more game-related parameters, is stored correspondingly to each of a plurality of items of operation information, which indicates details of an operation for making the game machine execute the given game processing. The game machine judges whether or not the one or more game-related parameters satisfy the parameter condition, which is stored correspondingly to the operation information indicating details of an operation made by a game player. Depending on the judgment, the above-mentioned given game processing is executed. Therefore, the present invention enables a game player to give the game machine an instruction to execute predetermined game processing and to specify a condition for starting the execution of the predetermined game processing by performing a predetermined operation. As a result, the game is made more interesting.

According to an aspect of the present invention, the operation information is information indicating the amount of operation supplied to a given operating member, and the operation details obtaining means obtains, as the details of the game player's operation, the amount of operation supplied to the given operating member. In this way, a game player can specify a condition for starting the execution of given game processing by means of the amount of operation supplied to the given operating member.

In this aspect, the operation information may be information indicating how many times a given button is pressed, and the operation details obtaining means may obtain, as the details of the game player's operation, the number of times the given button is pressed. In this way, a game player can specify a condition for starting the execution of given game processing by means of the number of times a given button is pressed.

In this aspect, the operation information may be information indicating the time during which a given button is being pressed, and the operation details obtaining means may obtain, as the details of the game player's operation, the time during which the given button is being pressed. In this way, a game player can specify a condition for starting the execution of given game processing by means of the time during which a given button is being pressed.

In this aspect, the operation information may be information indicating the force with which a given button is pressed, and the operation details obtaining means may obtain, as the details of the game player's operation, the force with which the given button is pressed. In this way, a game player can specify a condition for starting the execution of given game processing by means of the force with which a given button is pressed.

According to an aspect of the present invention, the one or more parameters are parameters indicating a game situation, and the game screen is a screen showing the game situation. In this way, a game player can specify a condition about a game situation as a condition for starting the execution of given game processing.

In this aspect, the given game processing may be processing for making an operation subject perform a given action, and the one or more parameters may include a parameter indicating the current position of the operation subject. In this way, a game player can instruct an operation subject to perform a given action, and can also specify a condition about the current position of the operation subject as a condition for starting the given action.

In this aspect, the given game processing may be processing for moving a mobile object toward a given objective position, the one or more parameters may include a parameter indicating the current position of the mobile object, and the parameter condition may be a condition about the parameter indicating the current position of the mobile object and the objective position. In this way, a game player can give an instruction to make a mobile object move toward a given objective position, and can also specify a condition about the current position of the mobile object and the objective position as a condition for starting the move.

Further, in this aspect, the game may be a ball sport game performed by an operation subject team, which is to be operated by a game player, and an opposing team with a ball serving as the mobile object, the given game processing may be processing in which a ball sport player character belonging to the operation subject team and keeping the ball passes the ball to a specific ball sport player character belonging to the operation subject team, the one or more parameters may include a parameter indicating the current position of a ball sport player character belonging to the opposing team, and the given objective position may be a position that is determined based on the current position of the specific ball sport player character. In this way, in a ball sport game, a game player can give a ball sport player character who belongs to an operation subject team and who is in possession of a ball an instruction to pass the ball to a specific ball sport player character, and can also specify a condition about the current position of the ball, an objective position, and the current position of a ball sport player character of the opposing team as a condition for carrying out the pass.

BRIEF DESCRIPTION OF THE DRAWINGS

FIG. 2 is a diagram showing an example of a controller.

FIG. 3 is a diagram showing functional blocks of the game machine according to the embodiment.

FIG. 4 is a diagram showing contents of information that is stored in the game machine.

FIG. 5 is a flow chart showing processing that is executed in the game machine.

BEST MODE FOR CARRYING OUT THE INVENTION

The following is a detailed description, based on the drawings, of an example of a preferred embodiment of the present invention.

Figure 1:
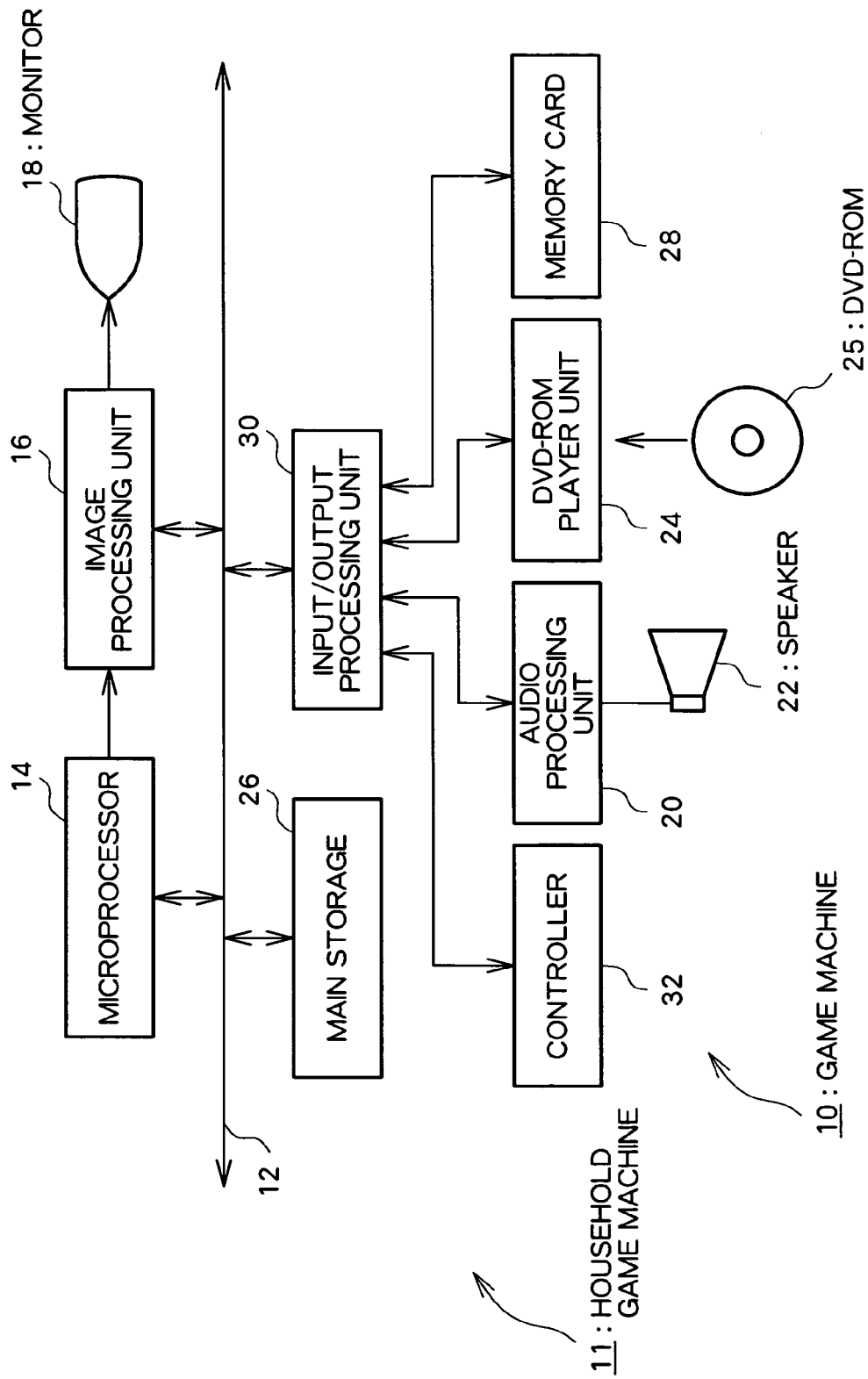
FIG. 1 is a diagram showing a configuration of a game machine according to an embodiment.

FIG. 1 is a diagram showing a configuration for a game machine of an embodiment of the present invention. A game machine 10 of FIG. 1 is constructed from a household game machine 11 having a DVD-ROM 25 and a memory card 28, both serving as information storage media, a monitor 18, and a speaker 22, all mounted or connected to the household game machine 11. For example, the monitor 18 may be a household television set receiver; the speaker 22 may be a built-in speaker thereof.

Further, the DVD-ROM 25 is used to supply the program to the household game machine 11 but any other information storage media such as CD-ROMs or ROM cards etc. may also be used. Moreover, the program may also be supplied to the household game machine 11 from a remote location via a data communication network such as the Internet, etc.

The household game machine 11 is a well-known computer game system including a microprocessor 14, an image processing unit 16, an audio processing unit 20, a main memory 26, a DVD-ROM player unit 24, an input/output processing unit 30, and a controller 32. The microprocessor 14, the image processing unit 16, the main memory 26, and the input/output processing unit 30 are connected so as to be capable of mutual data communication using a bus 12. The audio processing unit 20, the DVD-ROM player unit 24, the memory card 28, and the controller 32 are connected to the input/output processing unit 30. Each configuration element of the household game machine 11 other than the controller 32 is housed in a case.

The bus 12 is for exchanging addresses and data with each part of the household game machine 11. The microprocessor 14 controls each part of the household game machine 11 based on an operating system stored in a ROM (not shown), a program read from the DVD-ROM 25, and data read from the memory card 28, and provides the game to the game player.

The image processing unit 16 is constructed from a VRAM. The image processing unit 16 receives image data sent from the microprocessor 14, renders a game screen image into the VRAM based on the received image data, converts the content of the received image data into a video signal, and outputs the video signal to the monitor 18 at a predetermined timing. The main memory 26, for example, is constructed from RAM, which is written with programs read out from the DVD-ROM 25 and data read out from the memory card 28 as necessary. The main memory 26 can also be used in operations of the microprocessor 14 for work space.

The input/output processing unit 30 is an interface enabling the microprocessor 14 to access the audio processing unit 20, the DVD-ROM player unit 24, the memory card 28, and the controller 32. The audio processing unit 20 includes a sound buffer, and reproduces and outputs, via the speaker 22, various sound data, such as game music, game sound effects, messages, and so forth, which is read from the DVD-ROM 25 and stored in the sound buffer. The DVD-ROM player unit 24 reads programs recorded on the DVD-ROM 25 in accordance with instructions from the microprocessor 14. The memory card 28 includes non-volatile memory (for example, EEPROM) and is detachable from the household game machine 11. Saved data etc. for various games is stored in the memory card 28. The controller 32 is a general-purpose operation input means for enabling a game player to input various game operations. The input/output processing unit 30 scans the state of parts of the controller 32 at regular intervals (e.g., at 1/60-second intervals), and sends operation signals, which indicate results of the scan, to the microprocessor 14 via the bus 12. The microprocessor 14 judges what game operation is performed by the game player based on the operation signals.

FIG. 2 is diagram showing an example of the controller 32. The controller 32 shown in FIG. 2 is a general-purpose game controller. As shown in FIG. 2(*a*), the controller 32 has on its top surface a direction button 34, a start button 36 and buttons 38X, 38Y, 38A and 38B. As shown in FIG. 2(*b*), the controller 32 has on its back wall buttons 41L and 41R, which are placed on the left side and right side of the top half of the back wall, respectively, and buttons 39L and 39R, which are placed on the left side and right side of the bottom half of the back wall, respectively. The direction button 34 has a cross shape and is usually used to set a direction in which a character or the cursor is moved. The start button 36 is a small-sized push button having a triangular shape, and is usually used to start a game, forcibly terminate a game, or the like. The buttons 38X, 38Y, 38A, 38B, 39L, 39R, 41L and 41R are used for other game operations.

The direction button 34 and the buttons 38X, 38Y, 38A, 38B, 39L, 39R, 41L and 41R are built as pressure-sensitive buttons, and each have a pressure sensor. When a game player presses those buttons, a 256-level digital value ranging from 0 to 255 depending on the magnitude of the pressing force is entered in the household game machine 11. In other words, the household game machine 11 can judge from the digital value that, for example, the button is not being pressed when the digital value entered from the controller 32 is 0, and the button is being pressed at the maximum pressing force when the digital value entered is 255.

The game system 10 having the above-mentioned configuration provides a soccer game to be played for fun by a game player who operates soccer player characters of an operation subject team. This soccer game has a normal play mode and a first-person play mode. In the normal play mode, a game player plays the game by switching an operation subject from one soccer player character belonging to the operation subject team to another. In the first-person play mode, a game player plays the game by operating one soccer player character (specific a ball sport player character) that is chosen in advance as a main operation subject.

In either mode, a soccer player character to be operated acts in accordance with an operation made to the controller 32. For instance, the operation subject soccer player character moves on a game field in accordance with an operation made to the direction button 34. Also, the operation subject soccer player character performs an action such as a pass, a shot or a tackle in accordance with an operation made using the buttons 38A, 38B, 38X, 38Y and other buttons. Teammate soccer player characters (other soccer player characters belonging to the same operation subject team as the operation subject soccer player character) act in accordance with a given algorithm. Soccer player characters belonging to the opposing team act in accordance with an operation made by an opponent game player or a given algorithm.

In the first-person play mode, a pass request function is provided. This enables a game player not only to operate the specific soccer player character (main operation subject) but also to instruct a teammate soccer player character (subsidiary operation subject) that is in possession of the ball to pass the ball to the specific soccer player character.

With the pass request function described above, the game machine 10 allows a game player to specify a condition for starting the pass instead of merely instructing the teammate soccer player character to pass the ball to the specific soccer player character. For instance, a game player can give an instruction to carry out the pass only when the pass is likely to succeed, or an instruction to carry out the pass even if the possibility of the ball being successfully passed to the specific soccer player character is low. The game system 10 thus accomplishes a pass request function that makes the game more interesting.

Functional blocks implemented in the game machine 10 will now be described. FIG. 3 is a diagram focusing on some of the functional blocks in the game machine 10 that are related to the present invention. As shown in FIG. 3, the game machine 10 is configured to include a storage unit 50, a control unit 52 and a display unit 60. Those functions are implemented by having a computer such as a household game machine, a commercial game machine, a portable game machine, a cellular phone, a personal digital assistants, or a personal computer executing a program (supplied to the computer through a DVD-ROM or other computer-readable storage media, or through a communication network).

The display unit 60 is composed mainly of the monitor 18 and displays a game screen, for example, a screen showing a situation in the game space that is viewed from a given point of view.

The control unit 52 is composed mainly of the microprocessor 14 and the main storage 26. The control unit 52 performs various types of game processing at given time intervals, updates one or more game-related parameters, and causes the update to be reflected on the game screen. In this embodiment, a parameter indicating the position of the ball and game situation parameters, which are parameters indicating game situations such as the position, moving direction and posture of a plurality of soccer player characters belonging to the operation subject team or the opposing team, are updated through the game processing. A game screen is created based on the game situation parameter, and the created game screen is displayed on the display unit 60.

The storage unit 50 is composed of the DVD-ROM 25, a hard disk storage device, and the like. The storage unit 50 stores a parameter condition, which indicates a condition about one or more game-related parameters, in correspondence with each of a plurality of sets of operation information, which indicates details of an operation for making the game machine 10 execute given game processing (a specific game processing).

In this embodiment, there are a plurality of operations for instructing a teammate soccer player character that is in possession of the ball to pass the ball to the specific soccer player character (in other words, operations for making the game machine 10 execute processing to cause a teammate soccer player character that is in possession of the ball to pass the ball to the specific soccer player character). A condition for starting the execution of the pass is associated with each of the operations.

Specifically, the storage unit 50 stores information as the one shown in FIG. 4. In this example, information indicating the range of the number of times the button 39R is pressed (operation information) is associated with a condition about the degree of pass difficulty (pass difficulty level condition). A value "1 or larger and smaller than 5" of the number of times the button 39R is pressed (in other words, an operation of pressing the button 39R once or more and less than 5 times) is associated with a value "1 or smaller" of the pass difficulty level condition. A value "5 or larger and smaller than 10" of the number of times the button 39R is pressed (in other words, an operation of pressing the button 39R 5 times or more and less than 10 times) is associated with a value "2 or smaller" of the pass difficulty level condition. A value "10 or larger" of the number of times the button 39R is pressed (in other words, an operation of pressing the button 39R 10 times or more) is associated with a value "3 or smaller" of the pass difficulty level condition.

Herein, the pass difficulty level is numerical information indicating the likelihood of a pass from a teammate soccer player character that is in possession of the ball to the specific soccer player character being intercepted by a soccer player character of the opposing team or a referee. The larger the numerical value, the higher the likelihood of the pass being intercepted by a soccer player character of the opposing team, i.e., the stronger the possibility of failure of the pass.

The pass difficulty level in this embodiment takes numerical values "1", "2", and "3". The pass difficulty level "1" indicates a state in which there is no opposing team soccer player character that is positioned on or near the pass course (trajectory of a pass sent to the specific soccer player character). The pass difficulty level "2" indicates a state in which a soccer player character of the opposing team is positioned only near the pass course but not on the pass course. The pass difficulty level "3" indicates a state in which a soccer player character of the opposing team is positioned on the pass course.

The pass difficulty level is judged based on game situation parameters. For example, the pass difficulty level is judged based on some or all of a parameter indicating the position of the ball, a parameter indicating the position of a soccer player character that is in possession of the ball, a parameter indicating the position of the specific soccer player character, and parameters indicating the position of soccer player characters of the opposing team. The pass difficulty level condition is thus a condition about game situation parameters (parameter condition).

As described above, the game machine 10 changes the condition for letting a soccer player character that is in possession of the ball carry out a pass depending on the number of times the button 39R is pressed. For instance, in a case where the button 39R is pressed once or more and less than 5 times, a pass from a teammate soccer player character that is in possession of the ball to the specific soccer player character is started only when the pass difficulty level at that point in time is "1 or smaller". Similarly, in a case where the button 39R is pressed 5 times or more and less than 10 times, a pass to the specific soccer player character is started only when the pass difficulty level at that point in time is "2 or smaller". In a case where the button 39R is pressed 10 times or more, a pass to the specific soccer player character is started only when the pass difficulty level at that point in time is "3 or smaller". In short, the game machine 10 enables a game player to instruct a teammate soccer player character that is in possession of the ball to pass the ball to the specific soccer player character by pressing the button 39R, and also to specify a condition for starting the execution of the pass by means of the number of times the button is pressed.

Although the number of times the button 39R is pressed is associated here with the pass difficulty level condition, other measures of amount of operation made to a given operating member may be associated with the pass difficulty level condition. In other words, the condition for letting a teammate soccer player character that is in possession of the ball carry out a pass may be changed depending on other measures of amount of operation made to a given operating member.

To give an example, the time during which the button 39R is being pressed (range of the time during which the button is being pressed) may be associated with the pass difficulty level condition. In other words, the condition for letting a teammate soccer player character that is in possession of the ball carry out a pass may be changed depending on the length of the time during which the button 39R is being pressed. For instance, a value "T1 or larger and smaller than T2" of the time during which the button 39R is being pressed (operation of pressing the button 39R for a period of time of T1 or more and smaller than T2) may be associated with a value "1 or smaller" of the pass difficulty level condition. A value "T2 or larger and smaller than T3" of the time during which the button 39R is being pressed may be associated with a value "2 or smaller" of the pass difficulty level condition. A value "T3 or larger" of the time during which the button 39R is being pressed may be associated with a value "3 or smaller" of the pass difficulty level condition. In this way, a game player may be allowed to instruct a teammate soccer player character that is in possession of the ball to pass the ball to the specific soccer player character by pressing the button 39R, and also to specify a condition for starting the execution of the pass by means of the length of the time during which the button is being pressed.

To give another example, the magnitude of the pressing force (range of the pressing force) of the button 39R may be associated with the pass difficulty level condition. In other words, the condition for letting a teammate soccer player character that is in possession of the ball carry out a pass may be changed depending on the magnitude of the force with which the button 39R is pressed. For instance, a value "F1 or larger and smaller than F2" of the force with which the button 39R is pressed (operation of pressing the button 39R at a pressing force of F1 or more and smaller than F2) may be associated with a value "1 or smaller" of the pass difficulty level condition. A value "F2 or larger and smaller than F3" of the force with which the button 39R is pressed may be associated with a value "2 or smaller" of the pass difficulty level condition. A value "F3 or larger" of the force with which the button 39R is pressed may be associated with a value "3 or smaller" of the pass difficulty level condition. In this way, a game player may be allowed to instruct a teammate soccer player character that is in possession of the ball to pass the ball to the specific soccer player character by pressing the button 39R, and also to specify a condition for starting the execution of the pass by means of the magnitude of the force with which the button is pressed.

Similarly, in a case where the controller 32 has an operating member that outputs a digital value in accordance with the tilt (analog stick or the like), the tilt (range of the tilt) of the operating member may be associated with the pass difficulty level condition.

Alternatively, the type of operating member may be associated with the pass difficulty level condition. In other words, the condition for letting a soccer player character that is in possession of the ball carry out a pass may be changed depending on what operating member is operated. For instance, the button 39R (operation of pressing the button 39R) may be associated with a value "1 or smaller" of the pass difficulty level condition. The button 39L (operation of pressing the button 39L) may be associated with a value "2 or smaller" of the pass difficulty level condition. The button 41R (operation of pressing the button 41R) may be associated with a value "3 or smaller" of the pass difficulty level condition. In this way, a game player may be allowed to instruct a teammate soccer player character that is in possession of the ball to pass the ball to the specific soccer player character by pressing any one of the buttons, and also to specify a condition for starting the execution of the pass by means of the type of button that is pressed.

Similarly, the operation sequence (command) which is a combination of a plurality of operations made to one or more operating members may be associated with the pass difficulty level condition.

The control unit 52 is configured to include an operation details obtaining unit 54, a judging unit 56 and a game processing executing unit 58 as major components.

The operation details obtaining unit 54 obtains details of a game player's operation. The operation details obtaining unit 54 judges whether or not a given operating member is operated by a game player and judges the amount of operation made to the operating member. The operation details obtaining unit 54 obtains operation signals, which indicate whether or how the operating members of the controller 32 are being operated, at regular intervals, and makes those judgments from the operation signals.

In this embodiment, the operation details obtaining unit 54 obtains as details of a game player's operation the number of times the button 39R is pressed by the game player, and stores numerical information indicating the obtained count. In a case where how long the button 39R is being pressed is associated with the pass difficulty level condition in the information shown in FIG. 4, the operation details obtaining unit 54 may obtain the time during which the button 39R is kept pressed by a game player as details of the game player's operation. In a case where the magnitude of the pressing force of the button 39R is associated with the pass difficulty level condition in the information shown in FIG. 4, the operation details obtaining unit 54 may obtain the magnitude of the force with which the button 39R is pressed by a game player as details of the game player's operation.

The judging unit 56 judges whether or not one or more game-related parameters satisfy a parameter condition stored in the storage unit 50 in association with operation information which indicates operation details obtained by the operation details obtaining unit 54. For example, when a game player performs one of operations for making the game machine 10 execute given game processing, the judging unit 54 judges whether or not one or more game-related parameters satisfy a parameter condition corresponding to the operation.

Specifically, the judging unit 56 judges the pass difficulty level at the point in time based on a parameter indicating the current position of the ball (or of a teammate soccer player character that is in possession of the ball), a parameter indicating the current position of the specific soccer player character, parameters indicating the current position of soccer player characters of the opposing team, and/or other similar parameters. The judging unit 56 then judges whether or not the pass difficulty level at that point in time satisfies a pass difficulty level condition corresponding to the button press count stored by the operation details obtaining unit 54.

The game processing executing unit 58 executes given game processing in accordance with a judgment made by the judging unit 56. The game processing executing unit 58 according to this embodiment executes processing of letting a soccer player character that is in possession of the ball start a pass to the specific soccer player character, namely, processing of starting the movement of the ball to a pass objective position (pass start processing), depending on the judgment made by the judging unit 56.

Specifically, when it is judged that the pass difficulty level satisfies the pass difficulty level condition, the game processing executing unit 58 executes the pass start processing. When it is judged that the pass difficulty level does not satisfy the pass difficulty level condition, on the other hand, the game processing executing unit 58 does not execute the pass start processing.

Figure 6:
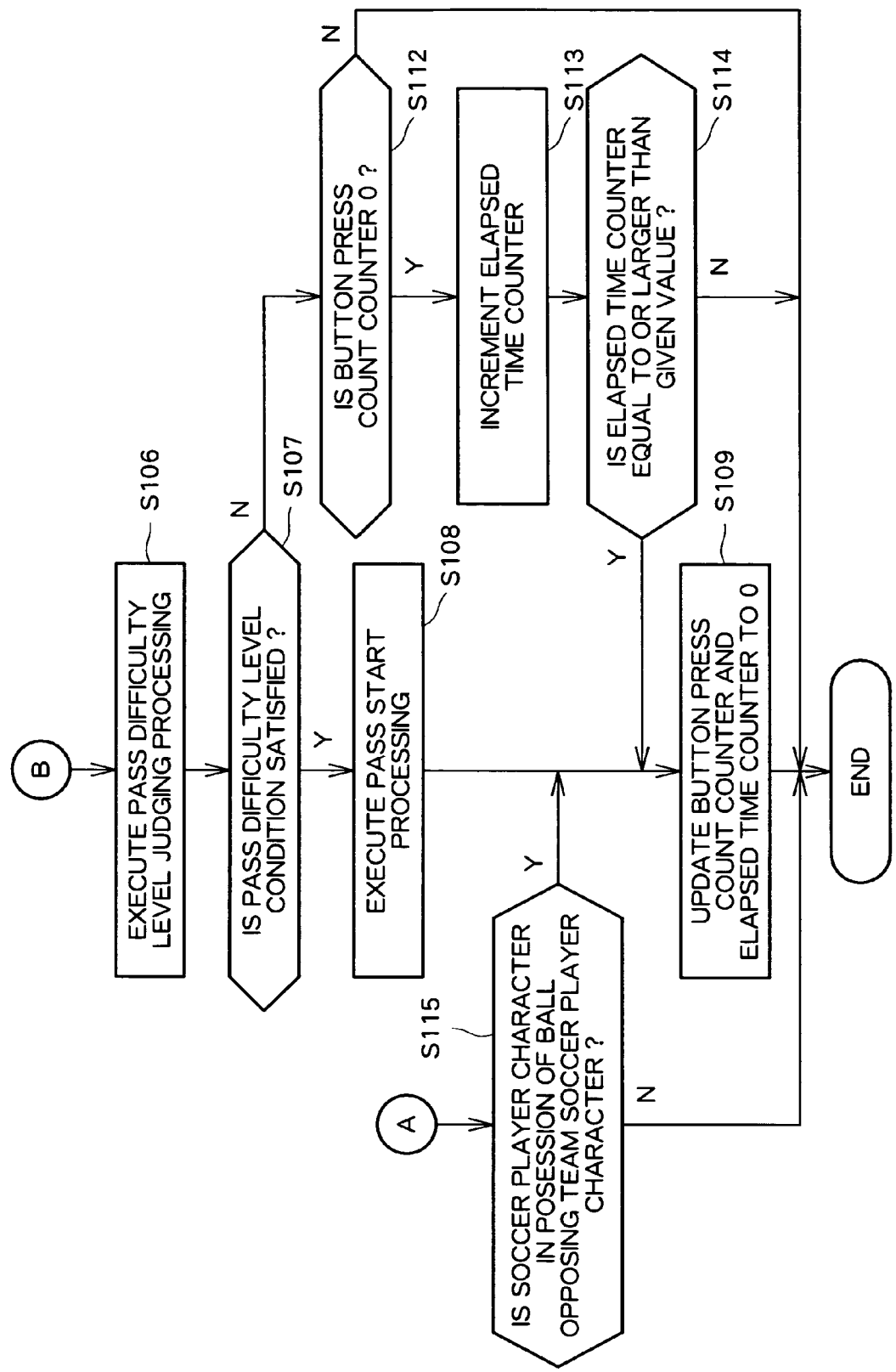
FIG. 6 is a flow chart showing processing that is executed in the game machine.

Processing executed in the game machine 10 will now be described. In the game machine 10, game processing is executed at given time intervals (e.g., at 1/30-second intervals). For instance, the game machine 10 executes processing of making the specific soccer player character perform an action in accordance with what operation is performed by a game player. The game machine 10 also executes processing of updating the position, posture and moving direction of other soccer player characters than the specific soccer player character in accordance with a given algorithm. FIGS. 5 and 6 are flow charts showing a part of periodically-executed game processing in the game machine 10 that is related to the present invention. The processing described below is accomplished by having the game machine 10 execute a program.

The premise in the following description is that the button 39R is judged as being pressed once at the time when the removal of the pressure on the button 39R is detected. With regard to this point, the button 39R may be judged as being pressed once at the time when the press of the button 39R is detected.

In this processing, the operation details obtaining unit 54 first judges whether or not the game player is pressing the button 39R (S101). The operation details obtaining unit 54 obtains operation signals, which indicate whether or how the operating members of the controller 32 are being operated, and judges from the operation signals whether the button 39R is being pressed or not.

Judging that the button 39R is being pressed, the operation details obtaining unit 54 updates a button press state flag to "1" (S110). The button press state flag is information indicating whether or not the button 39R is being pressed by a game player, and is kept in the main storage 26. The button press state flag takes a value "0" or "1". "0" indicates a state in which the button 39R is not being pressed by a game player. "1" indicates a state in which the button 39R is being pressed by a game player. When the button 39R is pressed by a game player, the button press state flag is updated from "0" to "1". The button press state flag is then kept at "1" until the button 39R is no longer pressed. As the pressure on the button 39R is removed, the button press state flag is updated from "1" to "0".

When it is judged that the button 39R is not being pressed, on the other hand, the operation details obtaining unit 54 judges whether or not the button press state flag is "1" (S102). When the button press state flag is "1", the operation details obtaining unit 54 judges that the pressure on the button 39R is removed. The operation details obtaining unit 54 in this case updates the button press state flag to "0" (S103).

The operation details obtaining unit 54 next judges whether or not the soccer player character that is in possession of the ball is a teammate soccer player character (S104). This is judged from various game situation parameters (for example, parameter indicating a soccer player character that is in possession of the ball).

Judging that the soccer player character that is in possession of the ball is a teammate soccer player character, the operation details obtaining unit 54 increments the value of a button press count counter (S105). The button press count counter is numerical information having 0 as the initial value, and shows the number of times a game player presses the button 39R as a pass request button. The value of the button press count counter is kept in the main storage 26.

Also, when it is judged in S102 that the button press state flag is "0" or when the processing of S110 is executed, the operation details obtaining unit 54 judges whether or not the soccer player character that is in possession of the ball is a teammate soccer player character (S111). The judgment is made in the same manner as in S104.

Figure 7:
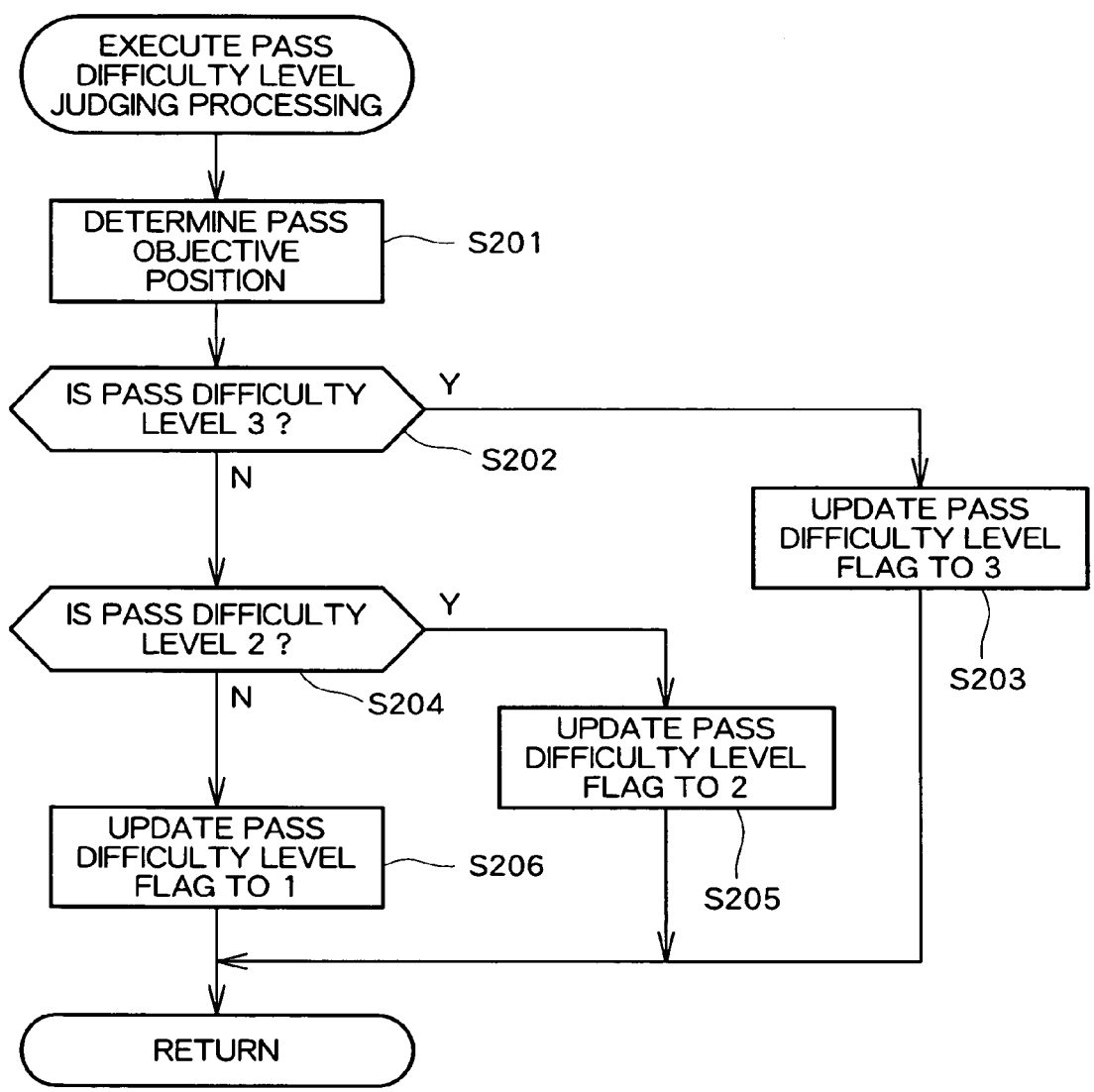
FIG. 7 is a flow chart showing processing that is executed in the game machine.

When the processing of S105 is executed or when it is judged that the soccer player character that is in possession of the ball is a teammate soccer player character in S111, the judging unit 56 executes pass difficulty level judging processing (S106). In this processing, the pass difficulty level at that point in time is judged based on various game situation parameters. FIG. 7 is a flow chart showing the pass difficulty level judging processing.

In the pass difficulty level described below, the pass difficulty level is judged on the premise that the pass from the soccer player character that is in possession of the ball to the specific soccer player character is a ground pass where the ball travels at a given height (for example, approximately the average height of the soccer player characters) from the ground or lower. In the following description, the pass difficulty level is judged based on the current position of soccer player characters of the opposing team. The current position of a referee may be added in judging the pass difficulty level.

As shown in the drawing, in the pass difficulty level judging processing, the judging unit 56 first determines a pass objective position (S201). The judging unit 56 determines the pass objective position based on the current position of the specific soccer player character. For example, the judging unit 56 may determine the current position itself of the specific soccer player character as the pass objective position, or may determine as the pass objective position an estimated arrival position of the specific soccer player character which is calculated based on the position, moving direction, posture and the like of the specific soccer player character.

The judging unit 56 judges whether or not the pass difficulty level at that point in time is "3" (S202). In other words, the judging unit 56 judges whether or not at least one of soccer player characters belonging to the opposing team is positioned on the pass course. Specifically, the judging unit 56 judges for each of soccer player characters belonging to the opposing team whether or not a first given range (first pass block range) which is based on the current position of the soccer player character covers the pass course.

Herein, the pass course is specified from the current position of the ball and the pass objective position. In this embodiment, a straight line connecting the current position of the ball and the pass objective position serves as the pass course in executing this processing.

The first pass block range is, for example, a range within a first given distance from the current position of a soccer player character in question. The size of the first pass block range may be determined based on a parameter of a soccer player character in question. For example, the size of the first pass block range of the soccer player character may be determined based on an ability parameter (e.g., defense parameter) of the soccer player character and a parameter indicating the current moving direction and moving speed (moving direction parameter) of the soccer player character at that point in time.

When it is judged that the first pass block range of at least one of the soccer player characters belonging to the opposing team covers the pass course, the judging unit 56 judges that the at least one of the soccer player characters is positioned on the pass course, and determines that the pass difficulty level is "3". On the other hand, when it is judged that none of the soccer player characters belonging to the opposing team has a first pass block range that overlaps with the pass course, the judging unit 56 judges that the pass difficulty level is not "3".

Judging that the pass difficulty level is "3", the judging unit 56 updates a pass difficulty level flag to "3" (S203). The pass difficulty level flag is information indicating the pass difficulty level and is kept in the main storage 26. The pass difficulty level flag takes values "1", "2", and "3". The pass difficulty level flag value "1" indicates that the pass difficulty level is "1". Similarly, the pass difficulty level flag values "2" and "3" indicate that the pass difficulty level is "2" and "3", respectively.

When it is judged that the pass difficulty level is not "3", the judging unit 56 judges whether or not the pass difficulty level at that point in time is "2" (S204). In other words, the judging unit 56 judges whether or not at least one of the soccer player characters belonging to the opposing team is positioned near the pass course. Specifically, the judging unit 56 judges for each of the soccer player characters belonging to the opposing team whether or not a second given range (second pass block range) which is based on the current position of the soccer player character covers the pass course.

The second pass block range is a range larger than the first pass block range. For instance, in a case where the first pass block range is defined as a range within the first given distance from the current position of a soccer player character in question, the second pass block range is a range within a second given distance (distance longer than the first given distance) from the current position of the soccer player character. As in the first pass block range, the size of the second pass block range may be determined based on a parameter of a soccer player character in question.

When it is judged that the second pass block range of at least one of player characters belonging to the opposing team covers the pass course, the judging unit 56 judges that the at least one player character is positioned near the pass course, and determines that the pass difficulty level is "2". On the other hand, when it is judged that none of the soccer player characters belonging to the opposing team has a second pass block range that overlaps with the pass course, the judging unit 56 judges that the pass difficulty level is not "2".

Judging that the pass difficulty level is "2", the judging unit 56 updates the pass difficulty level flag to "2" (S205). When it is judged that the pass difficulty level is not "2", on the other hand, the judging unit 56 determines that the pass difficulty level is "1", and updates the pass difficulty level flag to "1" (S206). The pass difficulty level judging processing is thus completed.

In the above-mentioned description, the pass difficulty level is judged on the premise that the pass from the soccer player character that is in possession of the ball to the specific soccer player character is a ground pass. However, in judging the pass difficulty level, it may be taken into consideration that the pass from the soccer player character that is in possession of the ball to the specific soccer player character can be a floating pass where the ball travels mainly at a given height from the ground or higher.

For example, the pass difficulty level may be judged on the premise that the pass from the soccer player character that is in possession of the ball to the specific soccer player character is a ground pass when the distance from the current position of the ball to the pass objective position (pass distance) is smaller than a given value. The pass difficulty level may be judged on the premise that the pass from the soccer player character that is in possession of the ball to the specific soccer player character is a floating pass when the pass distance is equal to or larger than the given value.

Under the premise that the pass from the soccer player character that is in possession of the ball to the specific soccer player character is a long, floating pass, the pass difficulty level may be defined as follows. The pass difficulty level "1" indicates a state in which no soccer player character of the opposing team is positioned at or near the pass objective position. The pass difficulty level "2" indicates a state in which a soccer player character of the opposing team is positioned not at the pass objective position but near the pass objective position. The pass difficulty level "3" indicates a state in which a soccer player character of the opposing team is positioned at the pass objective position.

In this case, in the processing of S202, whether the pass difficulty level is "3" or not is judged through the above-mentioned processing only when the pass distance is smaller than the given value. When the pass distance is equal to or larger than the given value, whether the pass difficulty level is "3" or not is judged by judging, for each of the soccer player characters belonging to the opposing team, whether or not the pass objective position is within a third given range (third pass block range) from the current position of the soccer player character.

Herein, the third pass block range is, for example, a range within a third given distance from the current position of a soccer player character in question. The size of the third pass block range may be determined based on a parameter of a soccer player character in question. For example, the size of the third pass block range of the player character may be determined based on an ability parameter (e.g., defense parameter) of the soccer player character and a parameter indicating the current moving direction and moving speed (moving direction parameter) of the soccer player character at that point in time. Further, the size of the third pass block range may be determined based on the length of the pass distance. For instance, the longer the pass distance becomes, the larger the size of the third pass block range of each of soccer player characters may become.

When it is judged that the third pass block range of at least one of the soccer player characters belonging to the opposing team contains the pass objective position, the judging unit 56 determines that the pass difficulty level is "3". On the other hand, when it is judged that none of the soccer player characters belonging to the opposing team has a third pass block range that contains the pass objective position, the judging unit 56 judges that the pass difficulty level is not "3".

Similarly, in the processing of S204, whether the pass difficulty level is "2" or not is judged through the above-mentioned processing only when the pass distance is smaller than the given value. When the pass distance is equal to or larger than the given value, whether the pass difficulty level is "2" or not is judged by judging, for each of soccer player characters belonging to the opposing team, whether or not the pass objective position is within a fourth given range (fourth pass block range) from the current position of the soccer player character.

The fourth pass block range is a range larger than the third pass block range. For instance, in a case where the third pass block range is defined as a range within the third given distance from the current position of a soccer player character in question, the fourth pass block range is a range within a fourth given distance (distance longer than the third given distance) from the current position of the soccer player character. As in the third pass block range, the size of the fourth pass block range may be determined based on a parameter of a soccer player character in question and the length of the pass distance.

When it is judged that the fourth pass block range of at least one of soccer player characters belonging to the opposing team contains the pass objective position, the judging unit 56 determines that the pass difficulty level is "2". On the other hand, when it is judged that none of the soccer player characters belonging to the opposing team has a fourth pass block range that contains the pass objective position, the judging unit 56 judges that the pass difficulty level is not "1".

Once the pass difficulty level judging processing described above is completed (S106), the judging unit 56 judges whether or not the value of the pass difficulty level flag satisfies a pass difficulty level condition corresponding to the value of the button press count counter (S107).

When it is judged that the pass difficulty level condition is satisfied, the game processing executing unit 58 executes the pass start processing (S108). The pass start processing is processing to make a teammate soccer player character that is in possession of the ball pass the ball to the specific soccer player character (processing for starting the movement of the ball to the pass objective position).

In the pass start processing, the pass objective position is determined first. The pass objective position is determined in a manner similar to S201. An initial velocity (velocity and direction) of the ball is also determined in the pass start processing. The initial velocity of the ball is determined based on the pass objective position, the pass distance, an ability parameter (e.g., pass capability parameter) of a soccer player character, and the like. For example, the initial velocity of the ball may be determined such that a ground pass is executed when the pass distance is smaller than a given value whereas a floating pass is executed when the pass distance is equal to or larger than the given value. The thus determined initial velocity of the ball is kept as part of game situation parameters in the main storage 26.

When the pass start processing is executed and the ball begins to move, in the next (game processing performed after a given period of time) and subsequent sessions of game processing, parameters indicating the position and moving speed of the ball are updated based on the initial velocity, and used to make a judgment about such matters as whether or not a pass is likely to be intercepted by one of the soccer player characters of the opposing team.

When it is judged in S107 that the pass difficulty level condition is not satisfied, the game processing executing unit 58 executes processing of S112 through S114 without executing the pass start processing. In other words, the game processing executing unit 58 judges whether or not the value of the button press count counter is 0 (S112). In a case where the value of the button press count counter is not 0, the game processing executing unit 58 increments the value of an elapsed time counter (S113). The elapsed time counter is numerical information having 0 as the initial value, and indicates the time elapsed since the button 39R is pressed for the first time as a pass request button. The value of the elapsed time counter is kept in the main storage 26.

The game processing executing unit 58 next judges whether or not the value of the elapsed time counter is equal to or larger than a given value (S114). When the value of the elapsed time counter is equal to or larger than a given value, the game processing executing unit 58 updates the values of the button press time counter and the elapsed time counter to 0 (initial value) (S109). In the game machine 10, the value of the button press count counter is thus reset after a given period of time elapses since the button 39R is pressed for the first time as a pass request button. If the button 39R is pressed as a pass request button after the value of the button press count counter is reset, it is treated as "the first press of the button (button press count: 1)". The initial value of the elapsed time counter may be a given value larger than 0, so the value of the elapsed time counter is decremented in Step S113 while a judgment is made in Step S114 about whether the value of the elapsed time counter is 0 or not.

The button press count counter and the elapsed time counter are updated to 0 also after the pass start processing is executed (S109).

Also, when it is judged that the player character that is in possession of the ball is not a teammate soccer player character in S104 or S111 and the soccer player character in possession of the ball is a soccer player character of the opposing team, the button press count counter and the elapsed time counter are updated to 0 (S115 and S109). In short, the button press count counter is also updated to 0 when the opposing team is in possession of the ball.

When it is judged in S104 that the soccer player character that is in possession of the ball is not a teammate soccer player character, processing to make the specific soccer player character perform an action corresponding to the button 39R in a situation where the opposing team is in possession of the ball (defense situation) or in a situation where the specific soccer player character is in possession of the ball, is executed. A description thereof is omitted here.

As described above, the game machine 10 enables a game player to instruct a teammate soccer player character that is in possession of the ball to pass the ball to the specific soccer player character by pressing the button 39R and also to specify a condition for starting the execution of the pass (condition about the situation of the periphery of the pass course) by means of the number of times the button is pressed. For instance, when the game player's intention is to pass the ball when the pass is likely to succeed, the game player can give an instruction to that effect by curbing the number of times the button 39R is pressed. In a case where the game player strongly wishes for the pass be carried out, the game player can give an instruction to carry out the pass irrespective of a low possibility of success by increasing the number of times the button 39R is pressed.

The present invention is not limited to the embodiment described above.

For instance, a first game player may operate one of the soccer player characters belonging to the operation subject team while a second game player operates another of the soccer player characters so that a plurality of game players operate the operation subject team in cooperation with each other.

In this case, the processing of S101 through S106 is executed for each of the plurality of game players. If the pass difficulty level condition is satisfied in S107 for only one of the game players, the pass start processing is executed to pass the ball to a specific soccer player character that is operated by this game player. In a case where the pass difficulty level condition is satisfied for two or more of the game players, which specific soccer player character is to receive the pass is selected based on the value of the button press count counter, the value of the pass difficulty level flag, or the combination of the two values. For example, a specific soccer player character operated by a game player that has the largest button press count counter value may be chosen as the intended receiver of the pass. To give another example, a specific soccer player character operated by a game player that has the smallest pass difficulty level flag value may be chosen as the intended receiver of the pass.

If the soccer game has a function for requesting a teammate soccer player character that is in possession of the ball to shoot, the present invention may be applied to the shoot request function.

Although an example of applying the present invention to a soccer game has been described above, application of the present invention is not limited to soccer games. The present invention is also applicable to games of sports such as basket ball and ice hockey, and games other than sports games.

Figure 8:
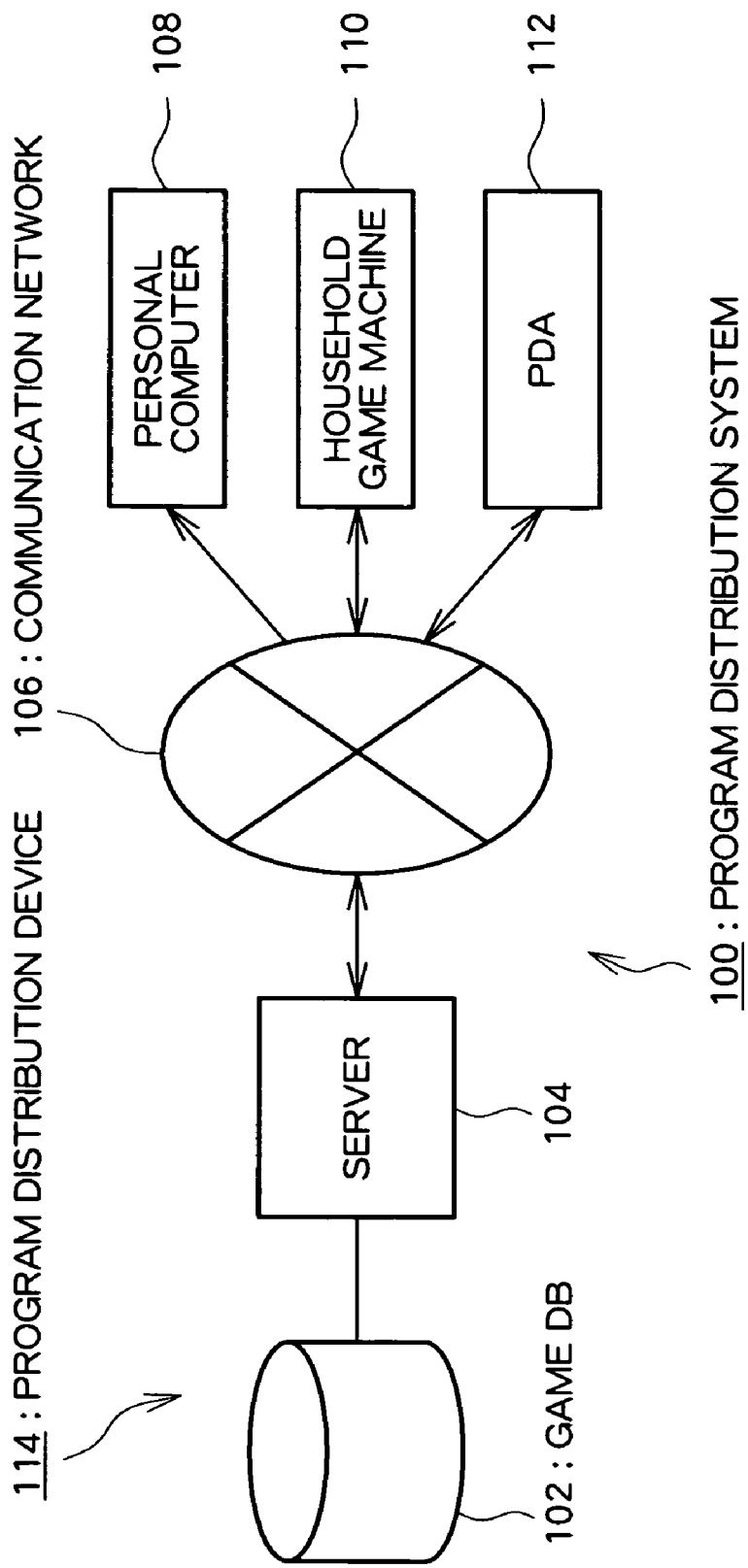
FIG. 8 is a diagram showing an overall configuration of a program distribution system according to another embodiment of the present invention.

The program, which in the above-mentioned description is supplied to the household game machine 11 through the DVD-ROM 25 as an information storage medium, may be distributed to households, etc. via a communication network. FIG. 8 is a diagram showing the overall configuration of a program distribution system that uses a communication network. A program distribution method according to the present invention is described with reference to FIG. 8. As shown in FIG. 8, this program distribution system 100 includes a game database 102, a server 104, a communication network 106, a personal computer 108, a household game machine 110 and a PDA (Personal Digital Assistants) 112. Of those, the game database 102 and the server 104 constitute a program distribution device 114. The communication network 106 is configured to include, for example, the Internet or a cable TV network. In this system, the game database (information storage medium) 102 stores the same program as the one stored in the DVD-ROM 25. A user requests delivery of a game through the personal computer 108, the household game machine 110, the PDA 112, or the like, and the request is transmitted to the server 104 via the communication network 106. The server 104 reads the program out of the game database 102 in accordance with the game delivery request, and sends the program to the personal computer 108, the household game machine 110, the PDA 112, or the like that has sent the game delivery request. A game is distributed here in response to a game delivery request, but the server 104 may send a game without being prompted by a request. It is not always necessary to distribute every program that is needed to play a game at once (lump-sum distribution), and only portions that are necessary for the current stage of the game may be distributed (installment distribution). Distributing a game via the communication network 106 in this manner enables a user to obtain the program with ease.

The invention claimed is:

1. A game machine which executes game processing at given time intervals,
updates one or more game-related parameters, and causes the update to be reflected on a game screen, wherein the game is a ball sport game performed by a game player's team, the game player operating a game player character belonging to the game player's team, and an opposing team, the game machine comprising:
a storage device that stores a parameter condition in correspondence with each of a plurality of items of operation information, the parameter condition indicating a degree of pass difficulty about the one or more game-related parameters, the operation information indicating details of an operation for making the game machine execute a given game processing, wherein the one or more game-related parameters include a parameter indicating a current position of a character belonging to the opposing team, and a parameter indicating a current position of the ball or the character belonging to the game player's team other than the game player's character and keeping the ball;
the given game processing comprises processing, in a processor, passing of the ball from another character belonging to the game player character's team that is in possession of the ball to the game player's character, in response to an instruction generated based on the degree of pass difficulty specified by the game player, the degree of pass difficulty including a first level indicative of a low degree of difficulty comprising an opposing team player not being near a trajectory of the ball, a second level indicative of a medium level of difficulty comprising the opposing team player being near the trajectory of the ball, and a third level indicative of a high level of difficulty comprising the opposing team player being in the trajectory of the ball, each of the first, second and third levels corresponding to a different range of amount of operation made to a given operating member;
operation details obtaining means for obtaining details of a game player's operation, wherein the operation details obtaining means obtains, as the details of the game player's operation, the amount of operation made to the given operating member;
judging means for judging whether or not the one or more game-related parameters satisfy the parameter condition based on an association between the
degree of the pass difficulty and the amount of the operation made to the given operating member as obtained by the operation details obtaining means, which is stored in the storage device correspondingly to operation information indicating the operation details obtained by the operation details obtaining means; and
game processing executing means for starting execution of the given game processing in accordance with a judgment made by the judging means.

2. A game machine according to claim 1, wherein:
the operation information is information indicating how many times a given button is pressed; and
the operation details obtaining means obtains, as the details of the game player's operation, the number of times the given button is pressed.

3. A game machine according to claim 2, wherein:
the one or more game-related parameters are parameters indicating a situation in the game, and
the game screen is a screen showing the situation in the game.

4. A game machine according to claim 1, wherein:
the operation information is information indicating the time during which a given button is being pressed; and
the operation details obtaining means obtains, as the details of the game player's operation, the time during which the given button is being pressed.

5. A game machine according to claim 4, wherein:
the one or more game-related parameters are parameters indicating a situation in the game, and
the game screen is a screen showing the situation in the game.

6. A game machine according to claim 1, wherein:
the operation information is information indicating a force with which a given button is pressed; and
the operation details obtaining means obtains, as the details of the game player's operation, the force with which the given button is pressed.

7. A game machine according to claim 6, wherein:
the one or more game-related parameters are parameters indicating a situation in the game, and
the game screen is a screen showing the situation in the game.

8. A game machine according to claim 1, wherein:
the one or more game-related parameters are parameters indicating a situation in the game, and
the game screen is a screen showing the situation in the game.

9. A game machine according to claim 1, wherein:
the one or more game-related parameters are parameters indicating a situation in the game, and
the game screen is a screen showing the situation in the game.

10. A method of controlling a game machine which executes game processing at given time intervals, updates one or more game-related parameters, and causes the update to be reflected on a game screen, wherein the game is a ball sport game performed by a game player's team, the game player operating a game player character belonging to the game player's team, and an opposing team, the method comprising:
obtaining details of a game player's operation;
judging in a microprocessor whether or not the one or more game-related parameters satisfy a parameter condition, which is stored in a storage device in correspondence with operation information indicating the operation details obtained in the obtaining step, the storage device storing a parameter condition in correspondence with each of a plurality of items of operation information, the parameter condition indicating a degree of pass difficulty about the one or more game-related parameters, the operation information indicating details of an operation for making the game machine execute a given game processing, wherein the one or more game-related parameters include a parameter indicating a current position of a character belonging to the opposing team, and a parameter indicating a current position of the ball or the character belonging to the game player's team other than the game player's character and keeping the ball, wherein the judging is based on an association between the degree of the pass difficulty and the amount of the operation made to the given operating member as obtained in the obtaining;
the given game processing comprises processing, in a processor, passing of the ball from another character belonging to the game player character's team that is in possession of the ball to the game player's character, in response to an instruction generated based on the degree of pass difficulty specified by the game player, the degree of pass difficulty including a first level indicative of a low degree of difficulty comprising an opposing team player not being near a trajectory of the ball, a second level indicative of a medium level of difficulty comprising the opposing team player being near the trajectory of the ball, and a third level indicative of a high level of difficulty comprising the opposing team player being in the trajectory of the ball, each of the first, second and third levels corresponding to a different range of amount of operation made to a given operating member; and executing in a microprocessor the given game processing in accordance with a judgment made in the judging.

11. A non-transitory information storage medium recording a program for making a computer function as a game machine that executes game processing at given time intervals, updates one or more game-related parameters, and causes the update to be reflected on a game screen, wherein the game is a ball sport game performed by a game player's team, the game player operating a game player character belonging to the game player's team, and an opposing team, wherein the program makes the computer function as:

storage means for storing a parameter condition correspondingly to each of a plurality of operation information, the parameter condition indicating a degree of pass difficulty about the one or more game-related parameters, the operation information indicating details of an operation for making the game machine execute a given game processing;

operation details obtaining means for obtaining details of a game player's operation;

judging means for judging whether or not the one or more game-related parameters satisfy the parameter condition, which is stored in the storage means in correspondence with operation information indicating the operation details obtained by the operation details obtaining means, wherein the one or more game-related parameters include a parameter indicating a current position of a character belonging to the opposing team, and a parameter indicating a current position of the ball or the character belonging to the game player's team other than the game player's character and keeping the ball, wherein the judging is based on an association between the degree of the pass difficulty and the amount of the operation made to the given operating member as obtained by the operation details obtaining means; and the given game processing comprises processing, in a processor, passing of the ball from another character belonging to the game player character's team that is in possession of the ball to the game player's character, in response to an instruction generated based on the degree of pass difficulty specified by the game player, the degree of pass difficulty including a first level indicative of a low degree of difficulty comprising an opposing team player not being near a trajectory of the ball, a second level indicative of a medium level of difficulty comprising the opposing team player being near the trajectory of the ball, and a third level indicative of a high level of difficulty comprising the opposing team player being in the trajectory of the ball, each of the first, second and third levels corresponding to a different range of amount of operation made to a given operating member;

game processing executing means for executing the given game processing in accordance with a judgment made by the judging means.

* * * * *